United States Patent [19]

Hattori

[11] Patent Number: 4,606,627

[45] Date of Patent: Aug. 19, 1986

[54] LIGHT SHUTTER MECHANISM FOR PLANETARIUM

[75] Inventor: Masamitu Hattori, Toyokawa, Japan

[73] Assignee: Minolta Camera Kabushiki Kaisha, Osaka, Japan

[21] Appl. No.: 704,835

[22] Filed: Feb. 25, 1985

[30] Foreign Application Priority Data

Apr. 24, 1984 [JP] Japan ................................. 59-82686

[51] Int. Cl.[4] .......................................... G09B 27/00
[52] U.S. Cl. ...................................... 353/88; 434/286; 353/94; 353/119
[58] Field of Search ................................. 434/284–287; 353/88, 89, 97, 94, 122, 119, 85, 87, 82; 362/321, 325, 342, 354

[56] References Cited

U.S. PATENT DOCUMENTS 2,437,825  3/1948  Kohn ........................... 362/325 X
3,256,619  6/1966  Frank .
3,571,954  3/1971  Frank .

*Primary Examiner*—Harry N. Haroian
*Attorney, Agent, or Firm*—Wolder, Gross & Yavner

[57] ABSTRACT

There is disclosed a light shutter mechanism for lens projector used in a planetarium and being capable of any required rotation. The light shutter mechanism comprises a plurality of inwardly slanted annular plate members positioned in surrounding relation to the lens projector and stacked at prescribed intervals in substantially parallel relationship to each other. The light shutter mechanism operates so as to shield light toward a region below a projection limit and to allow passage of light toward a region above the projection limit.

18 Claims, 21 Drawing Figures

LIGHT SHUTTER MECHANISM FOR PLANETARIUM

BACKGROUND OF THE INVENTION

The present invention relates to a planetalium for projecting stars and the like with a lens, and more particularly to a planetalium having a device for appropriately shutting light projecting from the lens.

Planetaria project a star field, the sun, moon, planets and the like onto a hemispherical dome for simulating the movements of these celestial bodies. To project these celestial bodies, the planetarium has a star-field projector and projectors for individually projecting the sun, moon, stars and the like. The planetarium may also have auxiliary projectors for projecting a scene on the earth or moon.

The star-field projectors serve to project fixed stars in a celestial sphere, may be classified as pinhole star-field projectors and lens projectors. The pinhole star-field projectors have a spherical or polyhedral shell and a light source positioned at the center thereof, the shell having a number of pinholes corresponding to the fixed stars. With a celestial sphere divided into plural sectors, and the lens projectors have a plurality of projection equipments on a shell which correspond to the sectors. The projection equiement has a star-field plate having many pinholes defined therein and lenses for projecting light having passed through the pinholes onto the dome. Generally, one light source placed at the center of the shell is shared by the projection equipments.

Whatever the type, the light source radiates light in all directions, and a light shutter means is necessary to limit the range of projection to the hemispherical dome. One such light shutter means employs an opaque liquid as disclosed in U.S. Pat. No. 3,256,619. Another light shutter means comprises a shutter disposed in each projection equipment of the lens star-field projector and closable by a weight when the direction of projection by the projection equipment is oriented below the horizon. Since these light shutter means utilize the action of gravity, they are effective only for domes in which the projection limit coincides with the horizon.

In recent years, there has been a demand for planetaria for simulating starry heavens as seen not only from earth but also from space. For the simulation of starry heavens as seen from space, the horizon is substantially meaningless. Therefore, there has been proposed a dome in which the entire projecting area is composed of an inclined hemisphere and observers' seats are directed toward a dome portion which has a projecting region below the horizon.

Figure 1A:
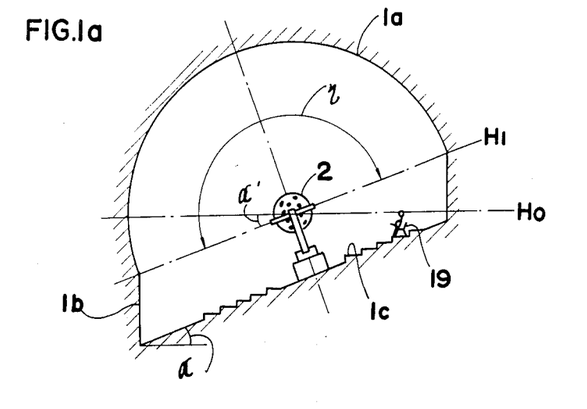
FIGS. 1(a) and 1(b) are schematic cross-sectional views of a hemispherical planetarium with an inclined projecting area.
Figure 1B:
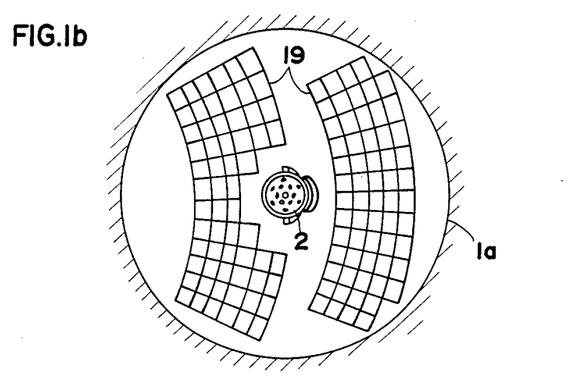
Figure 2:
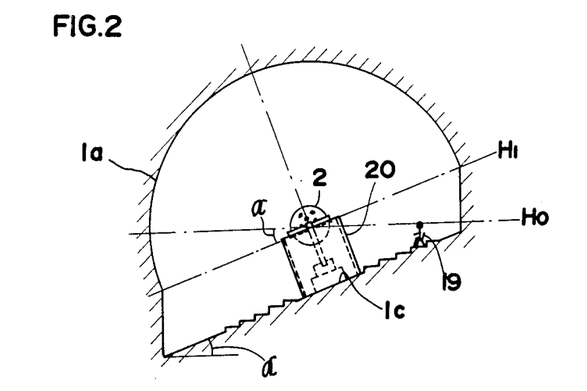
FIG. 2 is a schematic cross-sectional view of a planetarium having a cylindrical fence disposed as a light shutter member around a lens projector.

FIG. 1 of the accompanying drawings shows such a planetarium. The planetarium of FIG. 1 has a dome 1 composed of a hemispherical portion 1a inclined to the horizon Ho by an angle of $\alpha$, a cylindrical vertical wall portion 1b, and a floor 1c inclined to the horizon Ho by the angle of $\alpha$. The planetarium also has a star-field projector 2 disposed at the center of the hemisphere. Observers' seats 19 are arranged in the direction in which a projecting area extends below the horizon Ho. Where the projection limit is indicated by $H_1$ and an image is to be projected through an angle $\eta$ in the illustrated dome, with the star-field projector 2 being a pinhole projector, any image below the projection limit $H_1$ can be prevented from being projected by means of a cylindrical fence 20 having an upper edge lying in line with the projection limit $H_1$, as shown in FIG. 2. However, if the star-field projector 2 is a lens projector, then the gravity-dependent light shutter mechanism cannot be employed, and an image cannot well be shielded by the fence 20 as the shielding by the fence 20 results in a varying projection limit.

Figure 3:
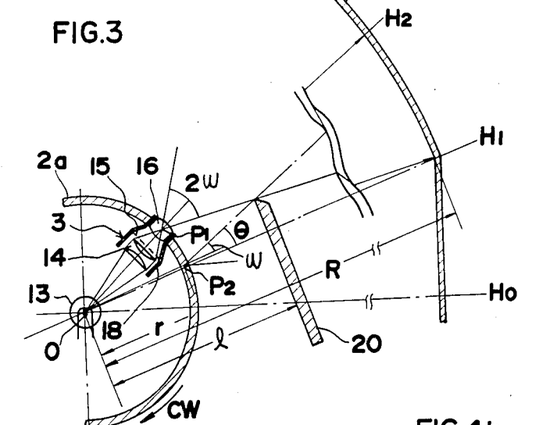
FIG. 3 is an enlarged fragmentary cross-sectional view of the planetarium of FIG. 2.

Such a varying projection limit will be described with reference to FIG. 3. The star-field projector 2 has a plurality of projection equipments 3 (only one shown) disposed on a circumferential surface of a spherical shell 2a, the star-field projector 2 being rotatable in any desired direction arround the center O of the shell 2a. The star-field projector 2 also has a light source 13 disposed at the center O. Each of the projection equipments 3 is composed of a condenser lens 14, a star-field plate 15 having pinholes corresponding to stars in a star field covered by the star-field plate 15, a projection lens 16, and a casing 18 holding the lenses 14, 16 and the star-field plate 15. The projection equipment 3 has an angle of projection field: $2\omega$. It is now assumed that where the projection equipment 3 is positioned as shown with an optical axis thereof being at $P_1$, i.e., the lower edge of the projection field angle $2\omega$ coincides with the projection limit $H_1$, the fence 20 is positioned so that it will shut off projecting light below the projection limit $H_1$. When the star-field projector 2 is rotated clockwise in FIG. 3 from the illustrated position, the projection equipment 3 continues to project an image until the upper edge of the projection field angle $2\omega$ reaches an upper edge of the fence 20, i.e., until the optical axis of the projection equipment 3 reaches $P_2$. At the time the projection equipment 3 is positioned with its optical axis at $P_2$, the image has been projected onto the dome while moving from an upper position toward a position $H_2$. As a result, the projection limit has risen from the position $H_1$ to the position $H_2$ through an angle $\theta$ which is formed between a line connecting the point $P_2$ and the upper edge of the fence 20 and the point $P_2$ and the projection limit $H_1$. Provided the projection field angle $2\omega$ is 46°, the shell 2a has a radius r of 50 cm, the dome 1a has a radius R of 1280 cm, and the distance l from the center of the shell 2a to the fence 20 is 100 cm, the angle $\theta$ is about 20° at maximum, which is quite undesirable in the performance of the planetarium. In case the upper edge of the fence 20 is aligned with the upper edge of the projection field angle $2\omega$, the projection limit will fall as the star-field projector 2 rotates counterclockwise, which is also disadvantageous in the performance of the planetarium. Although the star-field projector has been described by way of illustrative example, auxiliary projectors having lenses for image projection suffer from the same problem as described above.

SUMMARY OF THE INVENTION

Accordingly, it is a primary object of the present invention to provide a light shutter mechanism for use in a planetarium having a lens projector.

Another object of the present invention is to provide a light shutter mechanism for use in a planetarium having a lens projector capable of varying the direction of projection, the light shutter mechanism having a light shielding limit which will remain unchanged as the direction of projection from the lens projector varies.

Still another object of the present invention is to provide a light shutter mechanism for use in a planetarium, the light shutter mechanism having a light shielding limit which can be tilted or set at a desired tilt angle, and will remain unchanged as the direction of projection from the lens projector varies.

The above objects can be accomplished by a light shutter mechanism disposed in surrounding relation to a lens projector with the direction of projection therefrom being variable, the light shutter mechanism comprising a plurality of inwardly slanted annular plate members stacked at prescribed intervals in substantially parallel relationship to each other for shielding light toward a region below a projection limit while allowing passage of light toward a region above the projection limit. The light shutter mechanism also has members swingable about the center of the projector.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference characters throughout the several drawings.

DETAILED DESCRIPTION OF THE PREFERRED EMBODIMENTS

Figure 4A:
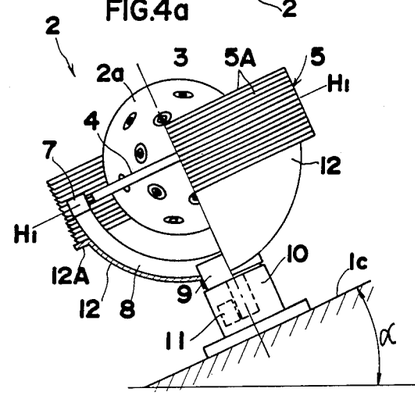
FIG. 4(a) is a side elevational view, partly cut away, of a light shutter mechanism according to a first embodiment of the present invention.
Figure 4B:
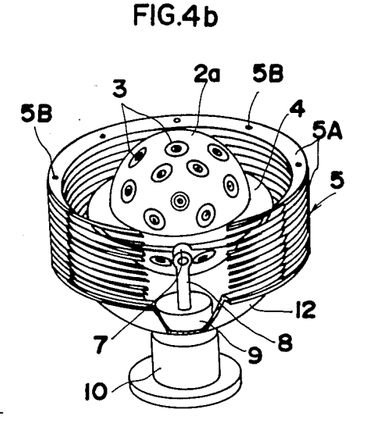
FIG. 4(b) is a perspective view of the light shutter mechanism shown in FIG. 4(a)
Figure 4C:
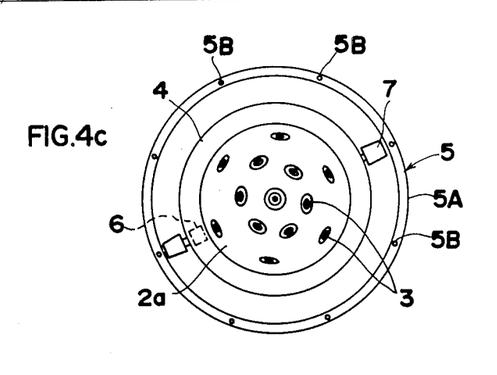
FIG. 4(c) is a plan view of the light shutter mechanism shown in FIG. 4(a)

A first embodiment of the present invention will be described with reference to FIGS. 4 through 9. According to the first embodiment, a light shutter mechanism is disposed with respect to a star-field projector 2. As shown in FIGS. 4(a), 4(b) and 4(c), a star ball 2a has a plurality of projection equipments 3 mounted on a shell and is rotatably supported by an annular support ring 4 which is supported by a semicircular support arm 8 for rotation about a line connecting the opposite ends of the support arm 8. The support arm 8 is fixed to a shaft 9 angularly movably mounted on a base 10 fixed to a floor 1c inclined at an angle $\alpha°$ to the horizon. The star ball 2a can be rotated in any desired direction by three driving means, that is, a first driving means 6 disposed in the support ring 4 for driving the star ball 2a along the support ring 4, a second driving means 7 mounted on the support arm 8 for driving the support ring 4, and a third driving means 11 disposed in the base 10 for driving the shaft 9.

The star ball 2a is surrounded by a first light shutter member 5 and a second light shutter member 12. The second light shutter member 12 comprises a hemispherical member fixed to the shaft 9 and held against an outer edge of the support arm 8. The second light shutter member 12 includes an outwardly extending flange 12A having an upper surface lying parallel to a projection limit $H_1$. The first light shutter member 5 comprises a plurality of annular light shutter plates 5A stacked at prescribed intervals in parallel relationship to each other and supported by support members 5B on the upper surface of the flange 12A.

Figure 5:
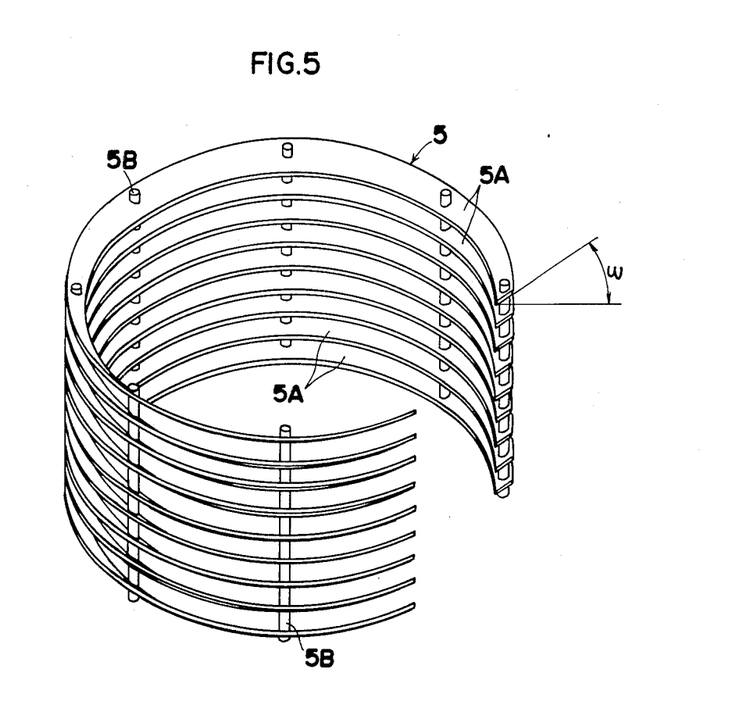
FIG. 5 is a perspective view of a light shutter body shown in FIGS. 4(a) through 4(c)
Figure 7:
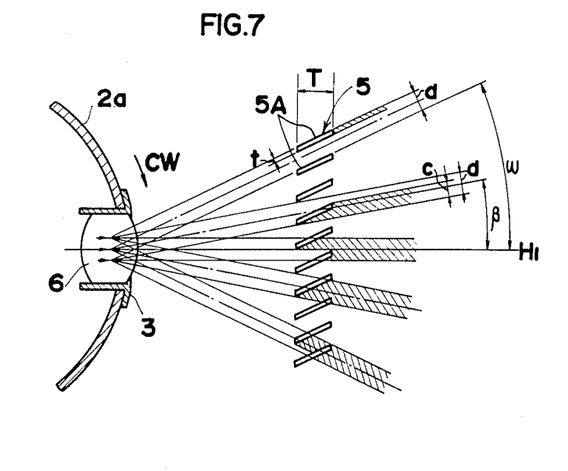
FIG. 7 is a fragmentary cross-sectional view explanatory of the principles of the light shutter mechanism of the present invention.
Figure 9:
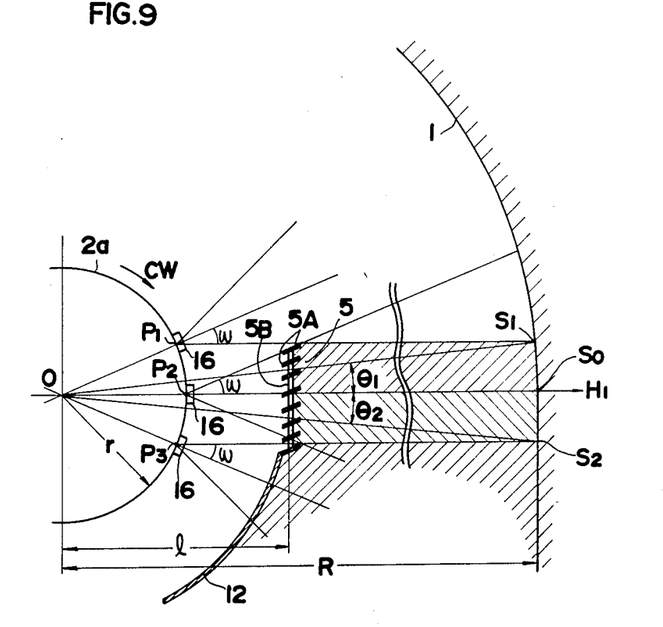
FIG. 9 is a fragmentary cross-sectional view illustrative of the function of the light shutter body at the time a projection lens is oriented in different directions.

FIG. 5 shows the first light shutter member 5 at an enlarged scale. As illustrated in FIGS. 7 and 9, each of the annular light shutter plates 5A is inclined inwardly with respect to the horizon $H_1$ of an image projected by the star ball 2a at an angle $\omega°$ which is half an angle of projection field $2\omega°$ of each projection equipment 3.

Figure 6:
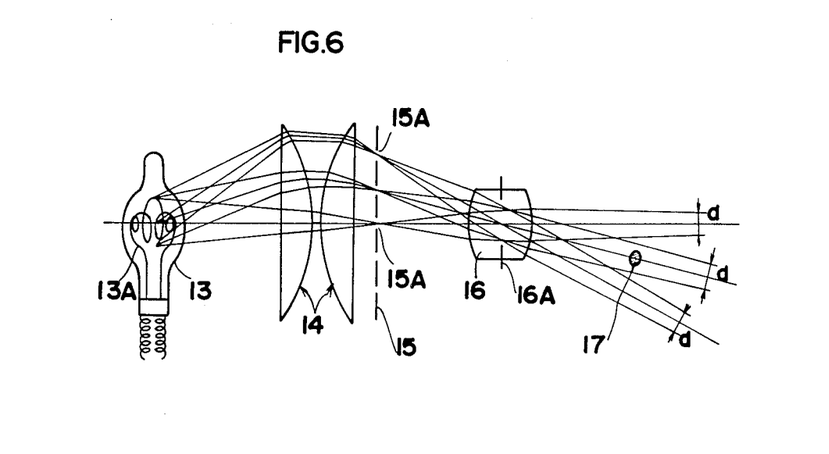
FIG. 6 is a schematic diagram showing a lens projector.

FIG. 6 illustrates a schematic optical path of one of the projection equipments 3. The projection equipment 3 includes a star-field plate 15 having pinholes 15A and illuminated by a light source 13 for projecting the pinholes 15A through a projection lens 16 as stars onto a screen of an inclined dome 1 (FIG. 9). Rays of light emitted from a filament 13A in the light source 13 are converged by condenser lenses 14 and pass through the pinholes 15A in the star-field plate 15. Then, the light rays go along the illustrated optical path and are focused in the vicinity of an aperture 16A in the projection lens 16, where the image of the filament 13A is formed in space. The light rays emitted through the pinholes 15A become parallel beams of light each having a diameter d after having left the projection lens 16. If a small light shutter body 17 having dimensions smaller than the diameter d of any light beam is placed in the light beam immediately following the projection lens 16, the projected star will only be slightly darkened, but not vanish, because some light rays travel past the light shutter body 17. The present invention is based on the above principles.

In FIG. 7, each of the annular light shutter plates 5A has a thickness t and a width T along the projected horizon or projection limit $H_1$, is inclined with respect to the projection limit $H_1$ at an angle $\omega$ which is half the projection field angle $2\omega$ of the projection lens 16, and the annular light shutter plates 5A are spaced in the direction of the thickness t at pitches equal to the diameter d of the light beams. By selecting the above dimensions to meet the following relationship:

$$T = (d-t)/\sin\omega$$

any stars which would be positioned below the projection limit $H_1$ are completely shielded or concealed by the first shutter member 5 when the projection lens 16 has an optical axis on the projection limit $H_1$.

A light beam d projected at an incident angle $\beta$ smaller than the angle $\omega$ is shielded by an annular light shutter plate 5A for an interval c, but is allowed to pass for an interval (d−c). The percentage of the shielded (or passed) portion of light is dependent on the incident angle $\beta$ of the light beam d. Such a relationship remains substantially constant even if the star ball 2a rotates clockwise in FIG. 7 to change the relative positional relation between the projection equipment 3 and the annular light shutter plates 5A.

Figure 8:
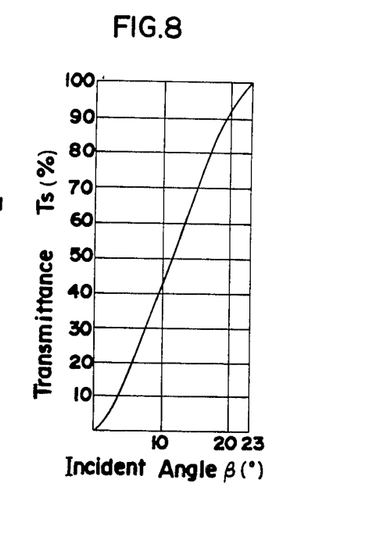
FIG. 8 is a graph showing the relationship between angles of incidence and transmittances of light according to the light shutter body.

FIG. 8 is a graph showing the relationship of transmittances Ts (%) to incident angles $\beta°$ of the light beam d under the conditions in which T meets the foregoing equation at $\omega=23°$, d=20 mm, and t=0.5 mm.

FIG. 9 shows the manner in which the light-shielding condition varies when the star ball 2a rotates clockwise to change the relative positional relation between the projection lens 16 and the first light shutter member 5. When the projection lens 16 of the star ball 2a is in a position $P_2$ lineally aligned with the projection limit $H_1$ with respect to the first light shutter member 5, the first light shutter member 5 completely shields any stars below the projection limit $H_1$. When the projection lens 16 is positioned at $P_1$ with the lower edge of the projection field angle $2\omega$ being lineally aligned with the uppermost annular light shutter plate 5A of the first light shutter member 5, the lowermost star projected from the star-field plate 15 is projected onto the dome 1 at a position $S_1$ above a position $S_0$ where the projection limit $H_1$ insersects the dome 1. The first light shutter member 5 now shields stars in a region defined by an angle $\theta_1$ above the projection limit $H_1$. When the projection lens 16 is in a position $P_3$ with the upper edge of the projection field angle $2\omega$ being lineally aligned with the lowermost annular light shutter plate 5A, the uppermost star is projected from $P_3$ onto the dome 1 at a position $S_2$ below the position $S_0$ where to the projection limit $H_1$ intersects the dome 1. The first light shutter member 5 therefore shields an area below a position which is downwardly displaced from the projection limit $H_1$ by an angle $\theta_2$. The light below the first shutter member 5 is shielded by the second hemispherical shutter member 12.

Assuming that the projection field angle $2\omega$ is 46°, the star ball 2a has a radius r of 50 cm, the dome 1 has a radius R of 1280 cm, the distance l from the center O of the star ball 2a to the first shutter body 5 is 80 cm (the distance bewteen the surface of the star ball 2a and the first shutter member 5 is 30 cm), and the first shutter member 5 is of a cylindrical shape with its axis normal to the projection limit $H_1$ and is of a size exactly overlapping the projection field angle $2\omega$ of the projection lens 16 as positioned at $P_2$, the angles $\theta_1$, $\theta_2$ are calculated as follows:

$$\theta_1 = \theta_2 = 0.9°$$

There angles are much smaller than a maximum of about 20° which has been required by the conventional fixed fence.

With the planetarium constructed as shown in FIGS. 4 through 9, the tendency of the horizon to rise and fall with respect to the projection limit can be substantially emiminated or reduced to the extent that no problem will occur in the performance of the planetarium.

Figure 10A:
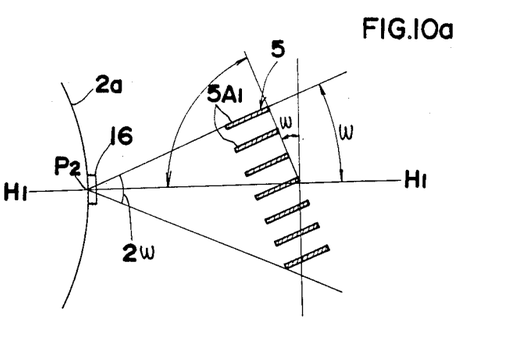
FIGS. 10(a) and 10(b) are cross-sectional and perspective views of a modification.
Figures 10B, 11:
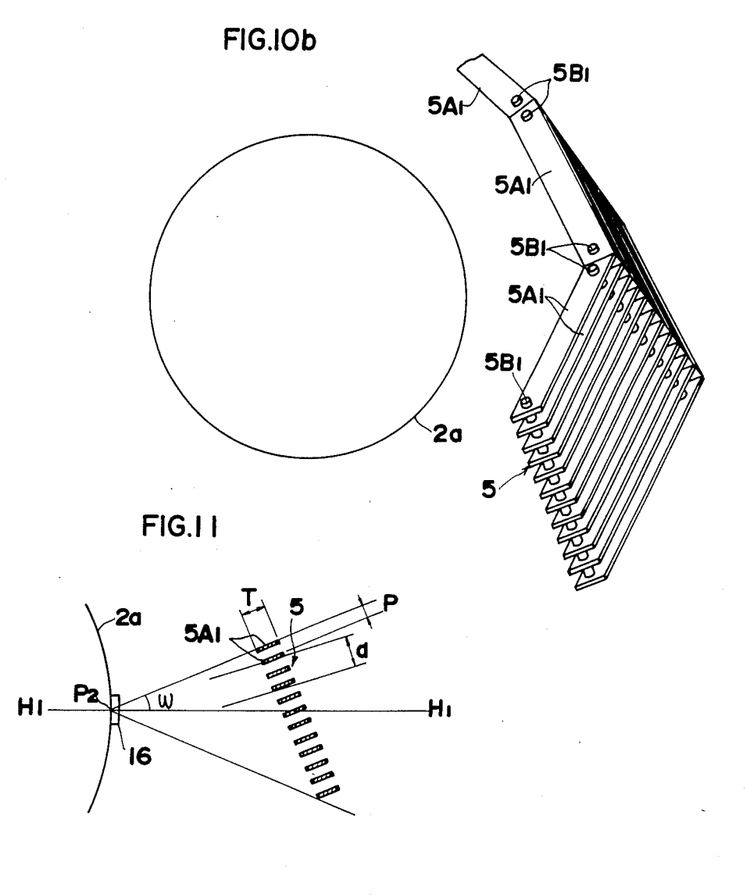
FIG. 11 is a cross-sectional view of another modification.

FIGS. 10(a) and 10(b) illustrates a modified first light shutter member 5 in the form of a truncated cone having a circumferential surface inclined at an angle $\omega$ toward the star ball 2a with respect to a direction normal to the projection limit $H_1$. The first light shutter member 5 is composed of a plurality of annular light shutter plates 5A each comprising a polygonal pattern of substantially rectangular light shutter pieces $5A_1$ connected end to end. The first light shutter member 5 is therefore in the shape of a polygonal truncated cone as a whole. As shown in FIG. 10(a), the first light shutter member 5 is so sized as to be contained within the projection field angle $2\omega$ of a projection lens 16 at a position $P_2$ on a projection limit $H_1$, with the uppermost light shutter piece $5A_1$ aligned with the upper edge of the projection field angle $2\omega$. As shown in FIG. 10(b), the light shutter pieces $5A_1$ are supported by support member $5B_1$ attached thereto perpendicularly to the surfaces of the light shutter pieces $5A_1$. The abutting ends of the adjacent annular light shutter pieces $5A_1$ are joined by bonding or other means.

With the first shutter member 5 thus constructed, the light shutter pieces $5A_1$ can be formed as flat plates, and attached to the support members $5B_1$ in perpendicular relation thereto. Thus, the first light shutter member 5 can be manufactured with ease.

FIG. 11 shows another modification of the present invention, in which the light shutter pieces $5A_1$ of the first shutter member 5 as shown in FIG. 10 are spaced at pitches smaller than the diameter d of a light beam emitted from a projection lens 16. With this arrangement, the maximum transmittance of the first light shutter member 5 is slightly reduced, but the first light shutter member 5 can be compact in size by decreasing the width T of the light shutter pieces $5A_1$.

Figure 12:
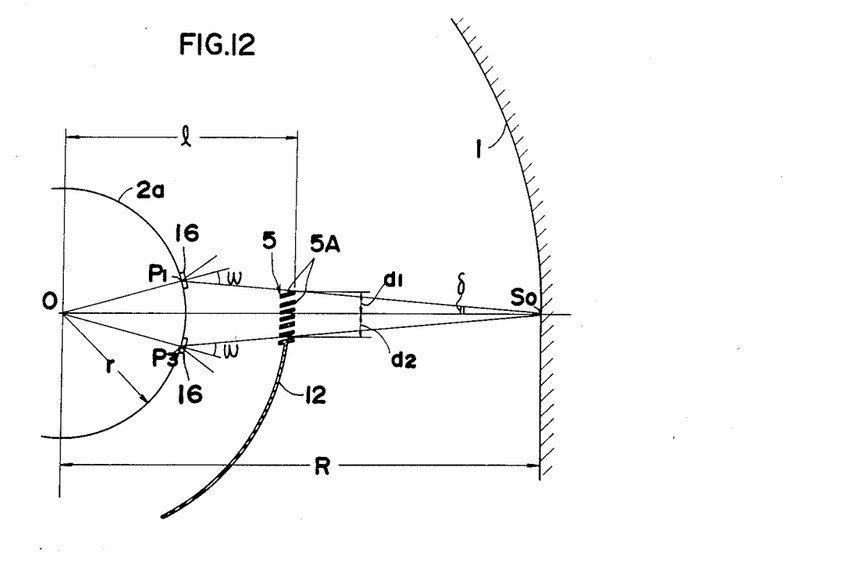
FIG. 12 is a cross-sectional view of still another modification.
Figure 13:
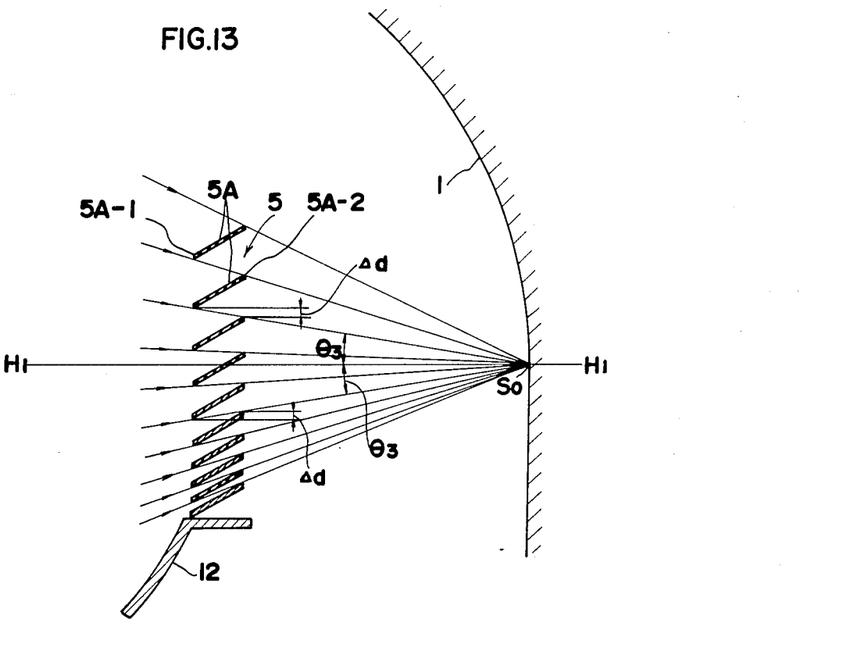
FIG. 13 is a cross-sectional view of the modification shown in FIG. 12.

FIGS. 12 and 13 are illustrative of still another modification. According to this modification, the first embodiment shown in FIG. 9 is modified such that the height $d_1$ of a portion of the light shutter member 5 above the projection limit $H_1$ and height $d_2$ of a portion of the light shutter member 5 below the projection limit $H_1$ are determined to fall between a light beam emitted from the projection lens 16 positioned at $P_1$ along the lower edge of the projection field angle $2\omega$ toward a point $S_0$ where the projection limit $H_1$ intersects the dome 1 and a light beam emitted from the projection lens 16 positioned at $P_3$ along the upper edge of the projection field angle $2\omega$ toward the point $S_0$. As shown in FIG. 13, the annular light shutter plates 5A are spaced at intervals or pitches which become progressively larger upwardly so that an inner edge 5A-1 of any upper annular light shutter plate 5A is connected to the point $S_0$ by a line on which is positioned an outer edge 5A-2 of a next lower annular light shutter plate 5A.

With the above arrangement of the first light shutter member 5, lowermost light beams passing through the first light shutter member 5 fall on the point $S_0$ even when the projection lens 16 is in the positions $P_1$ and $P_3$. As a consequence, the problem of the rising and falling horizon can completely be solved. The heights $d_1$, $d_2$ can be expressed by:

$$d_1 = d_2 = (R-l)\tan\delta = (R-l)\tan\{\sin^{-1}(r/R\sin\omega)\}$$

where r is the radius of the star ball 2, R is the radius of the dome 1, l is the distance from the center O of the star ball 2 to an outer edge of the first light shutter member 5, $\omega$ is half of the projection field angle of the projection lens 16, and $\delta$ is the angle of incidence of light from the projection lens 16 positioned at $P_1$ or $P_3$ toward the point $S_0$ on the dome 1. The above equation is derived since in the triangle $OPS_0$, $$\frac{R}{\sin\omega} = \frac{r}{\sin\delta}$$

$$\sin\delta = \frac{r}{R}\sin\omega$$

Therefore, $\delta = \sin^{-1}(r/R\sin\omega)$

While the annular light shutter plates 5A are inclined at a constant angle in the modification of FIG. 13, they may be inclined at progressively varying angles and spaced at equal pitches. More specifically, the pitches at inner and outer sides of the annular light shutter member 5 may be equal, and the light shutter plates 5A may be arranged such that a line connecting the inner edge of an upper light shutter plate and the outer edge of a next lower light shutter plate may be converged to the point $S_0$ on the dome 1.

Figure 14:
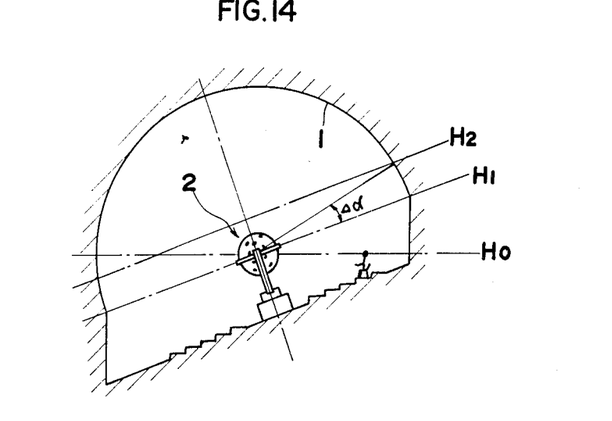
FIG. 14 is a schematic cross-sectional view showing a planetarium dome having a partly hemispherical projecting area.
Figure 15:
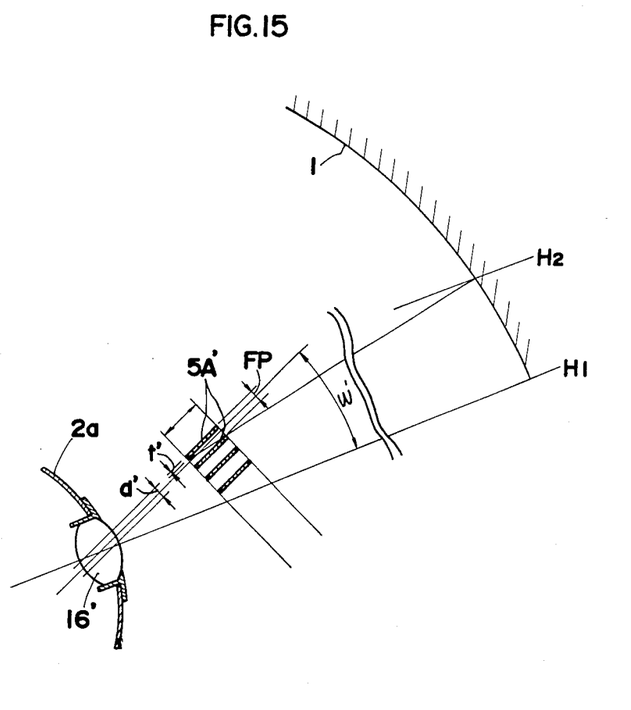
FIG. 15 is a fragmentary cross-sectional view of a modification for use with the planetarium shown in FIG. 14.

In the foregoing description, the projection area of the dome 1 is of a full hemisphere, or a hemisphere formed by cutting off a sphere with a great circle. As shown in FIG. 14, however, there may be employed a dome 1' having a partly hemispherical projecting area which is formed by cutting off a sphere with a small circle. With this arrangement, a star-field projector 2 is disposed at the center of the dome, and the projecting area has a projection limit $H_2$ above the projection limit $H_1$ of the full hemisphere. Where the present invention is applied to the partly hemispherical dome, the first embodiment and its modifications may be modified to accomplish the same effects. For example, as shown in FIG. 15, in case the annular light shutter plate 5A' is inclined to the projection limit $H_2$ at an angle $\omega'$ which is half the projection field angle $2\omega'$ of the projection lens 16, the width T' of the light shutter plate 5A' and the pitch FP of the light shutter plates 5A' are expressed as follows:

$$T' = \frac{d' - t'\cos\beta'}{\sin\beta'}$$

$$FP = \frac{d'}{\cos\beta'}$$

where $\beta' = \omega' - \Delta\alpha$, $\Delta\alpha$ is the angle formed between the projection limit $H_1$ defined by the great circle and the projection limit $H_2$ defined by the small circle with respect to the center of the dome 1, t' is the thickness of the light shutter plate 5A', and d' is the diameter of the light beam of a projected star.

The first embodiment and its modifications, as described above, are concerned with mechanisms for shielding light in the planetarium in which the projection limit $H_1$ is inclined at a given angle with respect to the actual horizon $H_0$. However, the disclosed mechanisms may be employed in a planetarium in which the projection limit $H_1$ is aligned with the actual horizon $H_0$.

Figure 16A:
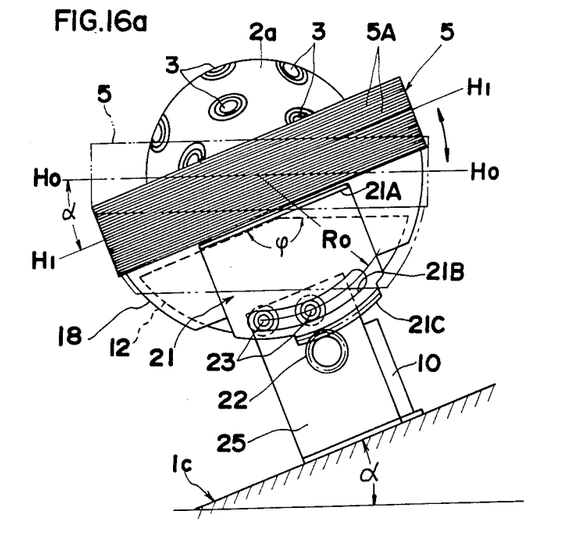
FIG. 16(a) is a side elevational view of a light shutter mechanism according to a second embodiment of the present invention.
Figure 16B:
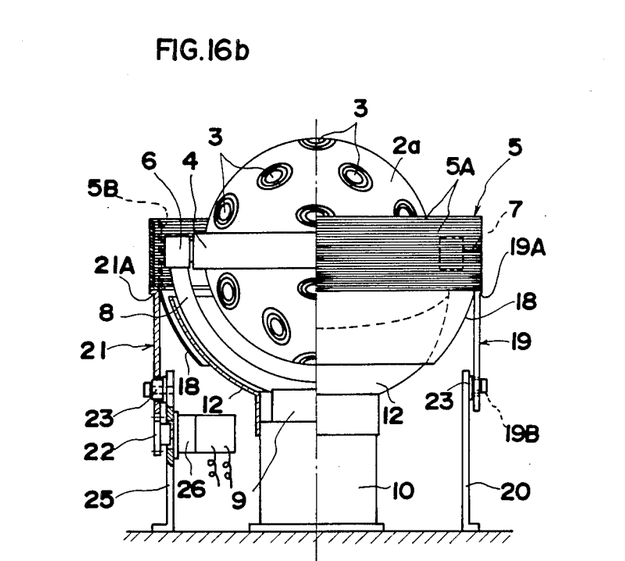
FIG. 16(b) is a front elevational view of the light shutter mechanism illustrated in FIG. 15.

FIGS. 16(a) and 16(b) show a second embodiment in which a light shutter mechanism can freely select an angle at which the projection limit $H_1$ is inclined to the horizon $H_0$. Such free selection of the angle of inclination of the projection limit $H_1$ allows the planetarium to give various performances. For example, the planetarium can reproduce a scene as seen from a spaceship when it leaves the earth or moon. Such a performance can be given by first aligning the projection limit $H_1$ with the horizon $H_0$, and then gradually inclining the projection limit $H_1$. Reversal of this performance can reproduce a landing of the spaceship. During the above performances, a scene of an earth's or moon's ground is projected onto a dome region below the projection limit $H_1$ and is moved as the projection limit $H_1$ is moved.

As illustrated in FIGS. 16(a) and 16(b), a star ball 2a is of the same arrangement as that of the first embodiment shown in FIG. 4. Although in the first embodiment the first light shutter member 5 is fixedly mounted on the flange 12A of the second light shutter member 12, first and second light shutter members according to the second embodiment are movable relatively to each other.

The first light shutter member, denoted at 5, is composed of annular light shutter plates 5A spaced vertically at prescribed intervals and supported by support members 5B. The first light shutter member 5 and a third shutter member 18, which is a hollow and truncated semicircular shape, are fixed to outwardly extending flanges 19A, 21A of swingable plates 19, 21, respectively. The first and third shutter members 5, 18 are swingably movable between a solid-line position and a two-dot-and-dash-line position shown in FIG. 16(a). A second shutter member 12' is fixed to a base 10 to prevent light from leaking from below the first and third shutter member 5, 18 throughout the range of their swinging movements. The second shutter member 12' has an upper edge lying parallel to the most inclined projection limit $H_1$ and another upper edge lying paralel to the actual horizon $H_0$ for shielding light in an angular range indicated by $\phi$.

The swingable plates 19, 21 have arcuate guide grooves 19B, 21B defined therein about the center of the star ball 2a each of the arcuate guide grooves 19B, 21B having a radius of curvature $R_0$. In each of the guide grooves 19B, 21B, there are fitted two flanged bearings 23, 23 rotatably supported on fixed plates 20, 25 mounted on the floor. One of the swingable plates 21 has a sector gear 21C defined on a lower edge portion thereof and held in mesh with a pinion 22 mounted on the shaft of a motor 26 secured to the fixed plate 25.

The first and third light shutter members 5,18 can be angularly moved about the center of the star ball 2a by energizing the motor 26, for thereby freely setting the projection limit $H_1$ to any angular position between the horizon to the inclined position at $\alpha$ as shown in FIG. 16(a). The first light shutter member 5 of the second embodiment can be modified in the same manner as the foregoing modifications of the first embodiment.

In the foregoing embodiments, the first light shutter member 5 is of a cylindrical shape (FIG. 5) or of a polygonal truncated cone. However, the first light shutter member 5 may be in the form of a prism or a circular cone. Therefore, the term "annular" used herein should be interpreted to mean "surrounding" the star ball, but not simply "ring-shaped".

While the second light shutter member in each of the above embodiments is hemispherically shaped for completely shielding the light beams, the first light shutter member may be extended down to the floor to perform the function of the second light shutter member. If some light beams leaked from the second light shutter member, no appreciable problem would take place unless the leaking light beams would be directed toward the dome screen and observers.

The light shutter mechanism of the present invention can be combined with any lens projectors, such as an auxiliary projector for projecting an enlarged image of a planet or the like, or a star-field projector which is not ball-shaped.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. In a planetarium having a lens projector with variable projecting direction and a predetermined projection field angle, a light shutter machanism comprising a plurality of inwardly slanted annular plate memebers positioned in surrounding relation to the lens projector and stacked at prescribed intervals in substantially parallel relationship to each other for shielding light toward a region below a projection limit while allowing passage of light toward a region above the projection limit.

2. A light shutter mechanism as claimed in claim 1, wherein the slanting angle of each of the annular plate members is half of projection field angle of the lens projecor.

3. A light shutter mechanism as claimed in claim 1, wherein the annular plate members are composed in a cylindrical shape.

4. A light shutter mechanism as claimed in claim 1, wherein the annular plate memebers are composed in a shape of a polygonal truncated cone.

5. A light shutter mechanism as claimed in claim 4, wherein the polygonal trucated cone has a circumferential surface inclined at angle half of projection field angle of the lens projector toward the lens projector with respect to a direction normal to the projection limit.

6. A light shutter mechanism as claimed in claim 4, wherein each of the annular plate members is formed to a polygonal pattern of substantially rectangular pieces connected at end to end.

7. A light shutter mechanism as claimed in claim 1 wherein stacked pitches between said annular plate members become progressively larger upwardly.

8. A light shutter mechanism as claimed in claim 1, further comprising supporting device for supporting the whole annular plate members to be swingable about the rotational center of the lens projector.

9. A light shutter mechanism as claimed in claim 8, wherein the supporting device includes a member supporting the whole annular plate members and connected swingably to the base and a drive source for driving the memebers so as to incline the annular plate memebers to any required angle.

10. In a planetarium having a star field projector which is capable of any required rotation and has a shell of substantially sphere shape, a plurality of lens projecting equipments for projecting a star field sector shared to each thereof and a light source positioned on the center of the shell, a light shutter mechanism comprising a plurality of inwardly slanted annular plate members positioned in surrounding relation to the star field projector and stacked at prescribed intervals in substantially parallel relationship to each other for shielding light toward a region below a projection limit while allowing passage of light toward a region above the projection limit.

11. A light shutter mechanism as claimed in claim 10, wherein the slanting angle of each of the annular plate members is half of projection field angle of the lens projecting equipments.

12. A light shutter mechanism as claimed in claim 10, wherein the annular plate members are composed in a cylindrical shape .

13. A light shutter mechanism as claimed in claim 10, wherein the annular plate members are composed in a shape of a polygonal truncated cone.

14. A light shutter mechanism as claimed in claim 13, wherein the polygonal trucated cone has a circumferential surface inclined at angle half of projection field angle of the lens projecting equipments toward the star field projector with respect to a direction normal to the projection limit.

15. A light shutter mechanism as claimed in claim 13, wherein each of the annular plate members is formed to a polygonal pattern of substantially rectangular pieces connected at end to end.

16. A light shutter mechanism as claimed in claim 10, wherein stacked pitches between said annular plate members become progressively larger upwardly.

17. A light shutter mechanism as claimed in claim 10, further comprising supporting device for supporting the whole annular plate members to be swingable about the rotational center of the star field projector.

18. A light shutter mechanism as claimed in claim 17, wherein the supporting device includes a member supporting the whole annular plate members and connected swingably to the base and a drive source for driving the members so as to incline the annular plate members to any required angle.

* * * * *